(12) United States Patent
Khatri et al.

(10) Patent No.: US 8,891,380 B2
(45) Date of Patent: Nov. 18, 2014

(54) SYSTEMS AND METHODS FOR SYNCHRONIZING FILTER RECORDS

(75) Inventors: Shrawan K. Khatri, San Diego, CA (US); Ajith T. Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 13/034,462

(22) Filed: Feb. 24, 2011

(65) Prior Publication Data

US 2011/0211596 A1 Sep. 1, 2011

Related U.S. Application Data

(60) Provisional application No. 61/308,733, filed on Feb. 26, 2010.

(51) Int. Cl.
| | |
|---|---|
| *G01R 31/08* | (2006.01) |
| *H04J 3/06* | (2006.01) |
| *H04L 12/801* | (2013.01) |
| *H04W 28/02* | (2009.01) |
| *H04L 12/54* | (2013.01) |
| *H04L 12/813* | (2013.01) |
| *H04L 12/891* | (2013.01) |
| *H04L 12/913* | (2013.01) |
| *H04L 12/911* | (2013.01) |
| *H04W 28/10* | (2009.01) |

(52) U.S. Cl.
CPC ........... *H04L 47/10* (2013.01); *H04W 28/0263* (2013.01); *H04L 12/5695* (2013.01); *H04L 47/14* (2013.01); *H04L 47/20* (2013.01); *H04L 47/41* (2013.01); *H04L 47/724* (2013.01); *H04L 47/824* (2013.01); *H04W 28/10* (2013.01)

USPC ............................ 370/242; 370/507; 370/509

(58) Field of Classification Search
None
See application file for complete search history.

(56) References Cited

U.S. PATENT DOCUMENTS

| | | | |
|---|---|---|---|
| 7,324,498 B2 | 1/2008 | Ahn et al. | |
| 7,385,946 B2 | 6/2008 | Devarapalli et al. | |
| 2003/0039259 A1 | 2/2003 | Madour | |
| 2007/0058545 A1* | 3/2007 | Nookala et al. | 370/230 |
| 2007/0115932 A1* | 5/2007 | Yang | 370/352 |
| 2007/0223421 A1* | 9/2007 | Zafer et al. | 370/331 |
| 2010/0008292 A1 | 1/2010 | Ludwig et al. | |
| 2011/0122885 A1* | 5/2011 | Hedman et al. | 370/412 |
| 2013/0083761 A1* | 4/2013 | Pandey | 370/329 |

FOREIGN PATENT DOCUMENTS

| | | |
|---|---|---|
| WO | WO0158088 A1 | 8/2001 |
| WO | WO2008011604 | 1/2008 |

OTHER PUBLICATIONS

Anonymous: 3GPP2-Drafts, 2500 Wilson Boulevard, Suite 300, Arlington, Virginia 22201, USA, Nov. 1, 2008, XP040484613.
Braden R, et al., "Version 1 Functional Specification; rfc2205.txt", IETF Standard, Internet Engineering Task Force, IETF, CH, Sep. 1, 1997, XP015007989, ISSN: 0000-0003.
International Search Report and Written Opinion—PCT/US2011/026364, ISA/EPO—May 9, 2011.

* cited by examiner

*Primary Examiner* — Christine Duong
(74) *Attorney, Agent, or Firm* — Charles E. Eggers (57) ABSTRACT

Systems and methods for synchronizing filter records between a mobile device and a network node are described herein. Upon detection of a precedence contention when installing filters at the network node, a synchronization command can be initiated to synchronize the filter records between the mobile device and the network node.

24 Claims, 10 Drawing Sheets

SYSTEMS AND METHODS FOR SYNCHRONIZING FILTER RECORDS

CROSS REFERENCE TO RELATED APPLICATION(S)

This application claims the benefit of U.S. Provisional Application No. 61/308,733, filed Feb. 26, 2010, the entire content of which is incorporated herein by reference.

BACKGROUND

1. Field

The present application relates generally to communications, and more specifically to synchronizing filter records between an access terminal and a network node.

2. Background

Wireless communication systems are widely deployed to provide various types of communication (e.g., voice, data, multimedia services, etc.) to multiple users. Further, such communications may be provided by a variety of sources. Mobile devices may send/receive data to/from a wireless communication network. The mobile device may be linked to the wireless communication network by a plurality of communication links. The mobile device may install traffic flow filters at a node on the communications network. The filters may be used to direct particular data packets over particular communication links between the node and the mobile device. The node and the mobile device may store records of the installed filters. For example, the set of installed filters may be referred to as one or more traffic flow templates (TFTs). The TFTs may also include additional information about the filters. New systems and methods that ensure that the records stored at the node and the mobile device remain synchronized are needed.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include synchronizing filter records between a node and a mobile device.

One embodiment of the disclosure provides a method for synchronizing traffic flow filter records between a terminal and a node. The method comprises detecting a traffic flow filter installation error. The method further comprises initiating a command to synchronize traffic flow filter records between the terminal and the node based at least in part on the detecting the traffic flow filter installation error.

Another embodiment of the disclosure provides a device operative in a communication network. The device comprises a processor. The device further comprises circuitry coupled to the processor. The circuitry and the processor are cooperatively configured to detect a traffic flow filter installation error. The circuitry and the processor are further cooperatively configured to initiate a command to synchronize traffic flow filter records with a communication device based at least in part on detecting the traffic flow filter installation error.

Yet another embodiment of the disclosure provides a computer program product, comprising computer-readable medium. The computer-readable medium comprises code for causing a computer to detect a traffic flow filter installation error. The computer-readable medium further comprises code for causing a computer to initiate a command to synchronize traffic flow filter records between a terminal and a node based at least in part on detecting the traffic flow filter installation error.

Another embodiment of the disclosure provides a device operative in a communication network. The device comprises means for detecting a traffic flow filter installation error. The device further comprises means for initiating a command to synchronize traffic flow filter records with a communication device based at least in part on detecting the traffic flow filter installation error.

BRIEF DESCRIPTION OF THE DRAWINGS

FIG. 3 is a functional block diagram of an exemplary access terminal (AT) shown in

FIG. 2.

DETAILED DESCRIPTION

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Furthermore, in the following description, for reasons of conciseness and clarity, terminology associated with the 1x Evolved Data Optimized (1xEV-DO) standards, as promulgated under the 3rd Generation Partnership Project 2 (3GPP2) by the International Telecommunication Union (ITU) is used. It should be emphasized that the invention is also applicable to other technologies, such as technologies and the associated standards related to Wideband Code Division Multiple Access (WCDMA), Time Division Multiple Access (TDMA), Orthogonal Frequency Division Multiple Access (OFDMA), 3rd Generation Partnership Project (3GPP), Long-Term Evolution (LTE) and so forth. Terminologies associated with different technologies can vary. For example, depending on the technology considered, the Access Terminal (AT) used in 1xEV-DO standards can sometimes be called a mobile station, a user terminal, a subscriber unit, a user equipment, etc., to name just a few. Likewise, the Access Node (AN) used in 1xEV-DO standards can sometimes be called an access point, a base station, a Node B, and so forth. It should be noted here that different terminologies apply to different technologies when applicable.

Figure 1:
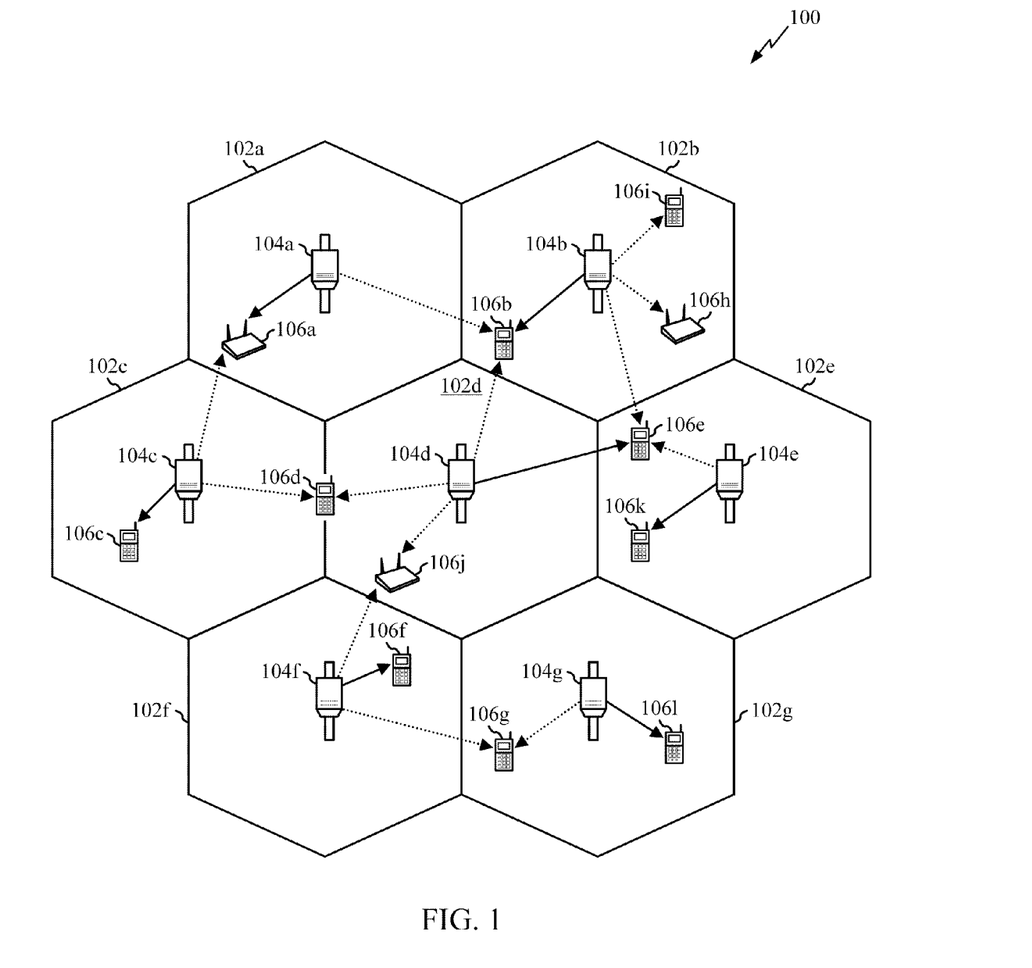
FIG. 1 illustrates an exemplary wireless communication network.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

Figure 2:
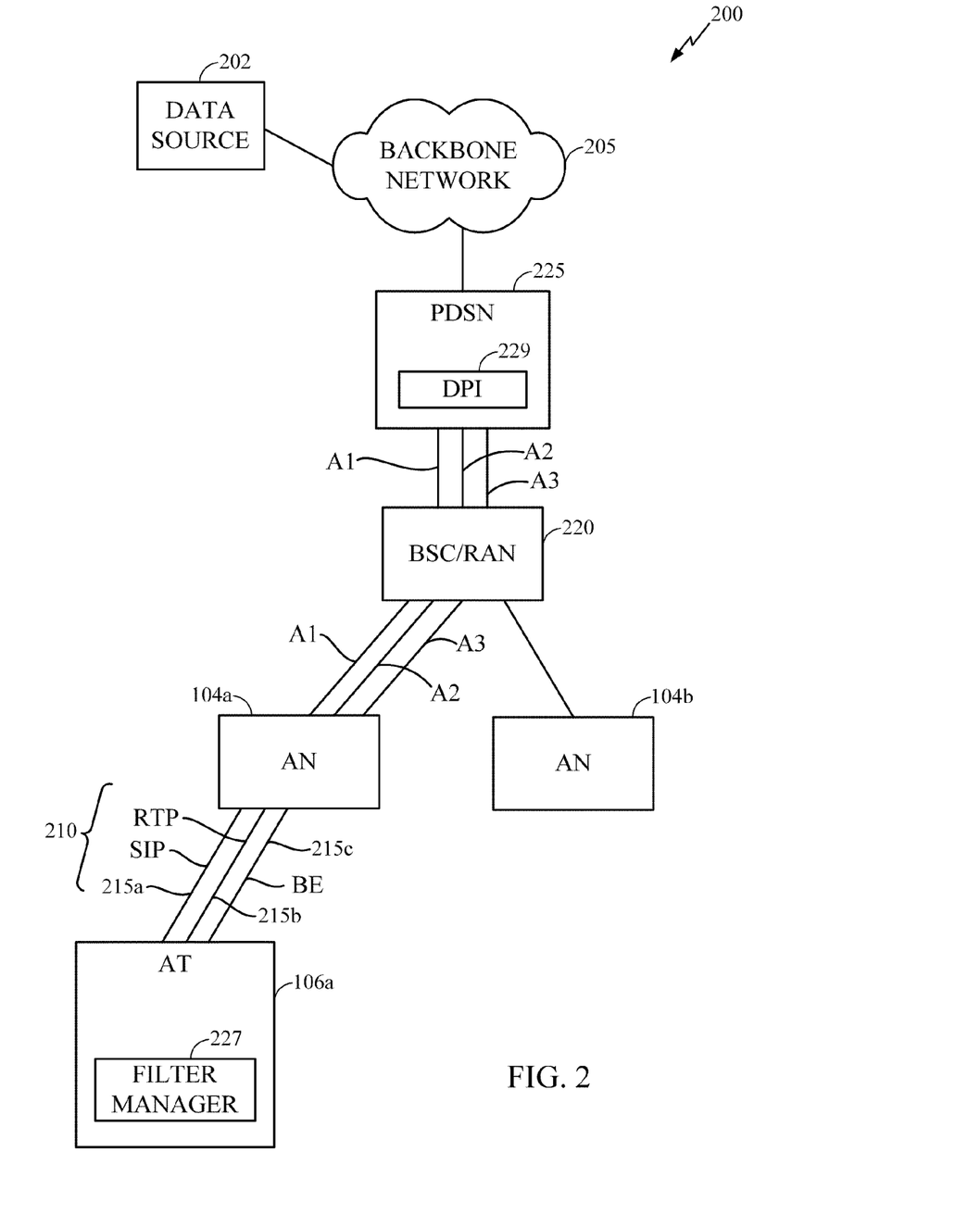
FIG. 2 is a functional block diagram of certain communication devices of the communication network of FIG. 1.

FIG. 2 is a functional block diagram of certain communication devices of the communication network of FIG. 1. It may be desirable for an AT 106a to receive data (e.g., data packets for a web browsing session, data packets for a Voice Over IP (VoIP) call, data packets for a video stream, or other data or media content) from one or more data sources such as data source 202 (e.g., a server controlled by a content provider, such as, internet websites provided by CNN®, YAHOO!®, etc.). FIG. 2 illustrates an exemplary embodiment in which the AT 106a may communicate with the data source 202 to receive information.

The AT 106a may send a request seeking data from the data source 202 to the AN 104a. The AT 106a may establish a communication link 210 with the AN 104a. The communication link 210 may be an appropriate wireless link, such as, an airlink. The AT 106a may send the request to the AN 104a via the communication link 210. The AT 106a may include a filter manager module 227. The filter manager module 227 may be configured to setup a filter for data received from the data source 202 as described in further detail below.

The communication link 210 may comprise one or more data pipes. For example, as shown in FIG. 2, the communication link 210 may comprise three data pipes 215a, 215b, and 215c. The data pipes 215a-215c may each comprise an airlink. It should be noted that communication link 210 may comprise fewer or a greater number of data pipes.

The AN 104a may receive from the AT 106a the request seeking data from the data source 202. The AN 104a may facilitate communication between the AT 106a and the data source 202 by sending the request for data to a base station controller (BSC) 220 via one or more links A1-A3 (e.g., A10 links) The combination of the BSC 220 and the ANs 104a and 104b is sometimes referred to as a radio access network (RAN). The one or more link A1-A3 may comprise one or more appropriate wired links (e.g., fiber optic cable, copper cable, etc.) and/or wireless links (e.g., airlinks) between the AN 104a and the BSC 220. It should be noted that one or more links A1-A3 may comprise fewer or a greater number of links. In one embodiment, each of the links A1-A3 provides a particular QoS level as discussed below. The AN 104a, the BSC 220, and a packet data service node (PDSN) 225 may setup the links A1-A3. For example, the AN 104a and PDSN 225 may exchange communications via the BSC 220 to setup the one or more links A1-A3 between the AN 104a and the PDSN 225 via the BSC 220.

The BSC 220 may receive from the AN 104a the sent request seeking data from the data source 202. The BSC 220 may facilitate communication between the AT 106a and the data source 202 by sending the request for data to the PDSN 225 via the one or more links A1-A3. The one or more link A1-A3 may comprise one or more appropriate wired links (e.g., fiber optic cable, copper cable, etc.) and/or wireless links (e.g., airlinks) between the BSC 220 and the PDSN 225. The BSC 220 may further communicate with one or more additional ANs (e.g., AN 104b) via one or more additional wired links.

The PDSN 225 may receive from the BSC 220 the sent request seeking data from the data source 202. The PDSN 225 may facilitate communication between the AT 106a and the data source 202 by sending the request for data to the network 205 via an appropriate wired (e.g., fiber optic cable, copper cable, etc.) or wireless link (e.g., airlink). In another embodiment, the PDSN 225 may be directly connected to the data source 202 by an appropriate wired or wireless link. The PDSN 225 may comprise a data packet inspection (DPI) module 229. The DPI module 229 may be configured to inspect data packets received from the network 205 and direct them over the appropriate one or more links A1-A3 according to one or more filters as described in detail below.

The network 205 may receive from the PDSN 225 the request seeking data from the data source 202. The network 205 may facilitate communication between the AT 106a and the data source 202 by sending the request for data to the data source 202 via an appropriate wired or wireless link. The network 205 may comprise, for example, an intranet or a part of the Internet. In one embodiment, the network 205 operates pursuant to the internet protocol (IP) as promulgated by the Internet Engineering Task Force (IETF). The network may be in communication with one or more additional data sources (not shown).

The data source 202 may receive from the network 205 the request for data. The data source 202 may comprise a server connected to the network 205. The data source 202 may serve data content such as video streams to devices that access the network 205. The AT 106a may access the data source 202 to retrieve video streams or other data as described above. Accordingly, the data source 202 may process the received request and transmit the requested data to the AT 106a via the network 205, the PDSN 225, the BSC 220, and the AN 104a. The choice of links (e.g., data pipe 215a and link A1), referred to herein as a communication paths, between each of the communication apparatuses described may be based on a traffic flow filter for transmission of the data from the data source 202 to the AT 106a as discussed below.

In the 1xEV-DO standard, installation of a traffic flow filter for a data packet is initiated by the AT 106a. For example, in one embodiment AT 106a may execute or run one or more applications that provide data content to a user of the AT 106a. The AT 106a may install traffic flow filters for different data packets associated with one or more applications. For example, a first application for streaming video may receive data packets over a first communication path according to a first traffic flow filter, while a second application for browsing the World Wide Web may receive data packets over a second communication path according to a second traffic flow filter.

Further, a given application may receive data packets over different communication paths at different times. For example, the first application for streaming video may have the ability to stream video from one or more data sources (e.g., data source 202). The communication path used to send packets from each of the one or more data sources may be different.

In one embodiment that AT 106a may setup a traffic flow filter for an application as follows. As discussed above, the AT 106a may setup the communication link 210 with the AN 104a comprising one or more data pipes 215a-215c. The AN 104a and the PDSN 225 may further setup one or more links A1-A3 via the BSC 220. The AT 106a may then transmit a message (e.g., a Resource reSerVation Protocol (RSVP) message) to the PDSN 225 via one of the data pipes 215a-215c of the communication link 210 and one of the links A1-A3. The RSVP message may comprise an indication of a filter (e.g., a traffic flow filter) for the PDSN 225 to send data packets having particular properties (e.g., from a particular source, with a particular internet protocol (IP) address, of a particular size, of a particular type, etc.) to the AT 106a over a particular communication path (e.g., data pipe 215b and link A2). One of ordinary skill in the art should recognize that a given data packet may meet the requirement of more than one filter. Accordingly, each filter installed at the PDSN 225 is installed with a particular precedence index (e.g., 0-255), which may be included in the RSVP message. The set of installed filters may be referred to as one or more traffic flow templates (TFTs). In one embodiment, the set of filters for IPv4 communications may be grouped into a first TFT, and the set of filters for IPv6 communications may be grouped into a second TFT. Additionally or alternatively, the TFTs may also comprise information about the filters. The precedence index indicates the order in which the PDSN 225 determines whether a given data packet meets the requirements of a particular filter. The PDSN 225 may check in order whether the data packets meet the requirements of a filter from index 0 to index 255 until the PDSN 225 finds such a filter. The PDSN 225 may then direct the data packet over the communication path indicated by the filter. If the data packet does not meet the requirements of any filter, the PDSN 225 may send the data packet over a default communication path.

Further, in response to the RSVP message, the PDSN 225 sets up a filter that directs packets. The PDSN 225 then sends a response message (e.g., a reservation (RESV) response message) to the AT via a forward link, indicating the PDSN received and installed the filter.

Each of the PDSN 225 and the AT 106a keep track of the installed filters. The information regarding the installed filters may be referred to as one or more traffic flow filter records (also referred to as "filter records"). The filter record(s) comprise information indicative of the one or more TFTs installed at the PDSN 225. Thus, the filter record itself may also be referred to as a TFT. Accordingly, each of the PDSN 225 and the AT 106a may store a filter record indicative of the installed filters for communication between the PDSN 225 and the AT 106a and the indexes of each of the installed filters.

Only one filter may be installed at the PDSN 225 for each precedence index for communication between the PDSN 225 and the AT 106a. For example, if a filter is installed at index 2, and the AT 106a requests installation of a filter at index 2, the PDSN 225 does not accept the filter and sends an error message (e.g., a RESV error message) to the AT 106a indicating the filter was not installed.

A problem may arise when there is bad reverse link or a bad forward link between the AT 106a and the PDSN 225. In the case of a bad reverse link, the AT 106a's request to install a filter at a particular index never reaches the PDSN 225. Accordingly, the filter is never installed and the PDSN 225 therefore never sends a response message to the AT 106a. Therefore, the AT 106a never receives a response message. In the case of a bad forward link, the AT 106a's request to install a filter at a particular index reaches the PDSN 225 and the filter is installed, but the response message sent by the PDSN 225 never reaches the AT 106a. Therefore, the AT 106a assumes no filter is installed at the index. The AT 106a may therefore send an RSVP message to install a filter again at the same index, resulting in an error, as a filter is already installed with the same index. In either case, the AT 106a does not receive a response message and therefore cannot determine whether a filter was installed or not resulting in the PDSN 225 and AT 106a not having synchronized filter records.

In one embodiment the AT 106a and PDSN 225 can maintain synchronized filter records. The AT 106a can re-synchronize filter records whenever an error message is received by the AT 106a. For example, in the scenario with a bad forward link, a filter may be installed at a particular index, but the AT 106a may not be able to determine that a filter is installed at that index. The AT 106a may then try and install a filter at that same index and receive an error message. The AT 106a then determines that the filter records are not synchronized. In one embodiment, the AT 106a sends a command to re-synchronize the records between the AT 106a and the PDSN 225. In one example, the command may be a Create Traffic Flow Template (TFT) command. The Create TFT command removes all of the filters at the PDSN 225 for one or more TFTs. The AT 106a then reinstalls all of its filters at the PDSN 225 and the filter records are synchronized. In another example, the command may be a Point-to-Point Protocol (PPP) Re-sync command. Similarly the PPP Re-sync command removes any dangling filters (filters that the AT 106a does not have in its records) at the PDSN 225. The filter records are then synchronized.

In another embodiment the PDSN 225 may initiate a command to re-synchronize the records between the AT 106a and the PDSN 225 when it detects an error and sends an error message to the AT 106a. For example, the PDSN 225 may initiate a PPP Re-sync command deleting all of the filters. In response, the AT 106a may initiate a Create TFT command and reinstall all the filters on the PDSN 225. Thus the filters records are synchronized.

Figure 3:
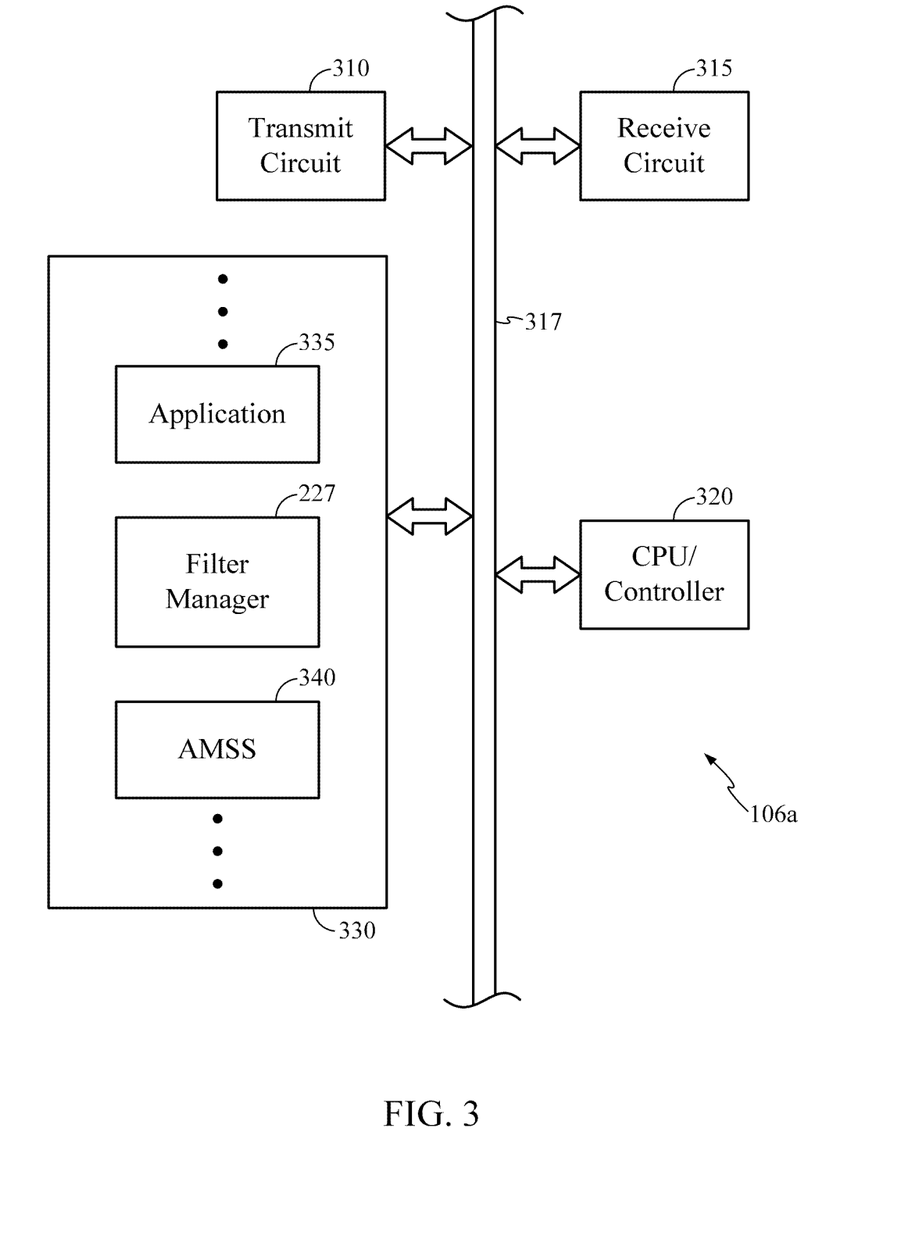

FIG. 3 is a functional block diagram of an exemplary access terminal 106a shown in FIG. 2. As discussed above with respect to FIG. 2, the AT 106a may communicate with the AN 104a to receive data from the data source 202 by sending a request for data to the data source 202 via the AN 104a. The AT 106a may comprise a transmit circuit 310 configured to transmit an outbound message, such as a request for data from the data source 202, to the AN 104a. The AT 106a may further comprise a receive circuit 315 configured to receive an incoming message, such as a data packet from the data source 202, from the AN 104a. The transmit circuit 310 and the receive circuit 315 may be coupled to a central processing unit (CPU)/controller 320 via a bus 317. The CPU 320 may be configured to process the inbound and outbound messages coming from or going to the AN 104a. The CPU 320 may also be configured to control other components of the AT 106a.

The CPU 320 may further be coupled to a memory 330 via the bus 317. The CPU 320 may read information from or write information to the memory 330. For example, the memory 330 may be configured to store inbound or outbound messages before, during, or after processing. The memory 330 may also comprise instructions or functions in the form of modules for execution on the CPU 320. For example, the memory 330 may comprise an application module 335, the filter manager module 227, and an advanced mode subscriber software (AMSS) module 340. The operation of the CPU 320 executing each of these modules is described below.

The application module 335 may comprise instructions executable on the CPU 320 that when executed cause the CPU 320 of the AT 106a to process incoming data packets. For example, the application module 335 may comprise a video player application that requests and receives video data packets from the data source 202 as described above with respect to FIG. 2. The CPU 320 executing the application module 335 may process the incoming video packets in order to generate a video for a user of the AT 106a to view.

The filter manager module 227 may comprise instructions executable on the CPU 320. When executed, the filter manager module 227 may cause the CPU 320 of the AT 106a to start generation of a filter message as discussed above with respect to FIG. 2. The filter manager module 227 further comprises a filter record stored in the memory 330. The filter manager module 227 may generate a filter message requesting a filter with a precedence index that is not the same as a filter identified in the filter record stored in the memory 330. The filter manager module 227 may direct the AMSS module 340 running on the CPU 320 to generate the filter message to send to the PDSN 225 to setup a filter at the PDSN 225 as discussed above with respect to FIG. 2.

When executed, the filter manager module 227 may further cause the CPU 320 of the AT 106a to resynchronize filter records with the PDSN 225 when an error message (e.g., a RESV error message) is received. For example, the AT 106a may receive an error message from the PDSN 225 via the receive circuit 315. The receive circuit 315 may send the error message to the CPU 320 via the bus 317. The CPU 320 executing the filter manager module 227 may determine the error message indicates that filter records between the PDSN 225 and the AT 106a are not synchronized. Accordingly, the filter manager module 227 may direct the AMSS module 340 running on the CPU 320 to send a command to synchronize filter records with the PDSN 225 (e.g., Create TFT or PPP re-synchronization).

The AMSS module 340 may comprise instructions executable on the CPU 320. The AMSS module 340 may act as an operating system driving the AT 106a. For example, the filter manager may interact with the AMSS module 340 to generate the filter message to setup the filter at the PDSN 225 or to generate a synchronization command to synchronize filter records with the PDSN 225. In one embodiment, the filter message may comprise the precedence index of the filter. The CPU 320 may send the filter message/synchronization command to the transmit circuit 310 via the bus 317. The transmit circuit 310 may transmit the filter message/synchronization command to the AN 104a to send to the PDSN 225. Further, the AMSS module 340 may comprise a radio frequency (RF) module, wireless protocol stack software used under different technologies and/or standards, etc.

The transmit circuit 310 may comprise a modulator configured to modulate outbound messages going to the AN 104a. The receive circuit 315 may comprise a demodulator configured to demodulate inbound messages coming from the AN 104a.

The memory 330 may comprise processor cache, including a multi-level hierarchical cache in which different levels have different capacities and access speeds. The memory 330 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, Zip drives, etc.

Although described separately, it is to be appreciated that functional blocks described with respect to the AT 106a need not be separate structural elements. For example, the CPU 320 and the memory 330 may be embodied on a single chip. The CPU 320 may additionally, or in the alternative, contain memory, such as processor registers. Similarly, one or more of the functional blocks or portions of the functionality of various blocks may be embodies on a single chip. Alternatively, the functionality of a particular block may be implemented on two or more chips.

One or more of the functional blocks and/or one or more combinations of the functional blocks described with respect to the AT 106a, such as the CPU 320, may be embodied as a general purpose processor, a digital signal processor (DSP), an application specific integrated device, discrete gate or transistor logic, discrete hardware components, circuitry or any suitable combination thereof designed to perform the functions described herein. Further, though described above as instructions stored in the memory 330 executable on the CPU 320, each of the application module 335, the filter manager module 227, and the AMSS module 340 may alternatively be embodied as a general purpose processor, a digital signal processor (DSP), an application specific integrated device, discrete gate or transistor logic, discrete hardware components, circuitry or any suitable combination thereof designed to perform the functions described herein and further each may be controlled by the CPU 320. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks, and the like, such as shown and described in FIG. 3. One or more of the functional blocks and/or one or more combinations of the functional blocks described with respect to the AT 106a may also be implemented as a combination of computing devices, e.g., a combination of a DSP and a microprocessor, a plurality of microprocessors, one or more microprocessor in conjunction with a DSP communication, or any other such configuration.

Figure 4:
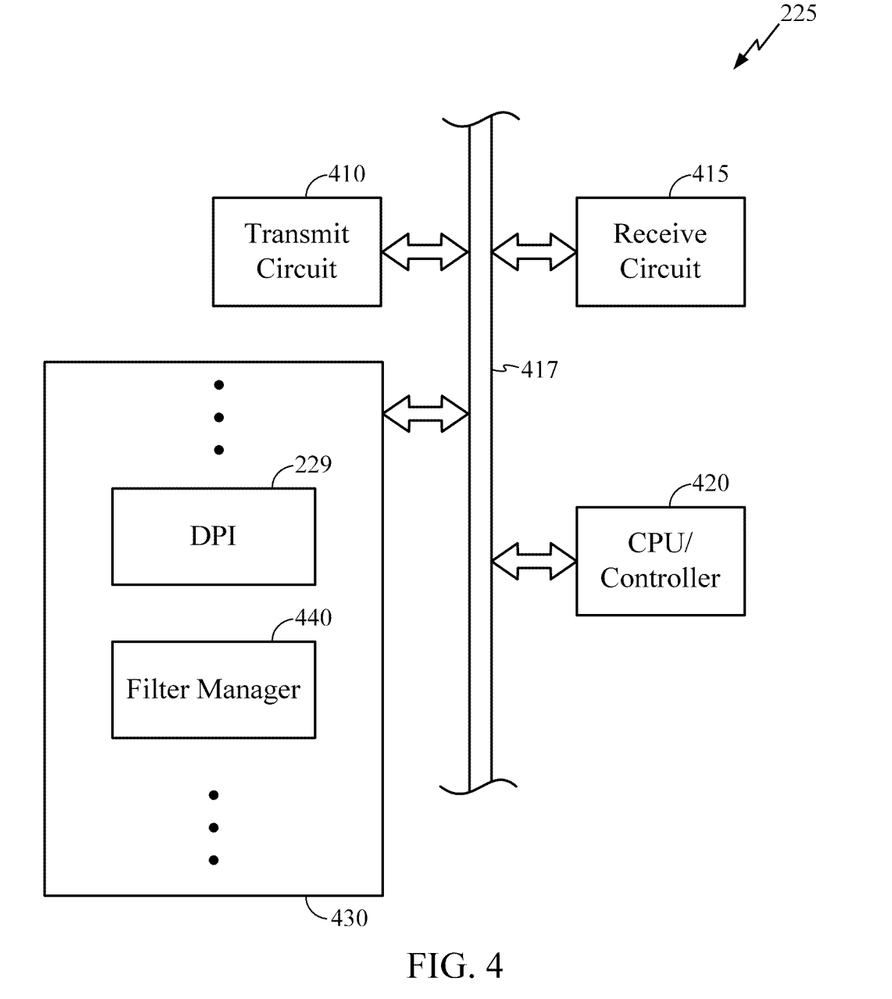
FIG. 4 is a functional block diagram of an exemplary packet data service node (PDSN) shown in FIG. 2.

FIG. 4 is a functional block diagram of an exemplary packet data service node (PDSN) 225 shown in FIG. 2. As discussed above with respect to FIG. 2, the PDSN 225 may communicate with the BSC 220 to send/receive data to/from the AT 106a. Further, the PDSN 225 may communicate with the network 205 to send/receive data to/from the data source 202 as discussed above with respect to FIG. 2. Accordingly, the PDSN 225 may facilitate communication between the AT 106a and the data source 202. The PDSN 225 may comprise a transmit circuit 410 configured to transmit an outbound message, such as a request for data from the data source 202, to the network 205. The PDSN 225 may further comprise a receive circuit 415 configured to receive an incoming message, such as a data packet from the data source 202, from the network 205. The transmit circuit 410 and the receive circuit 415 may be coupled to a central processing unit (CPU)/controller 420 via a bus 417. The CPU 420 may be configured to process the inbound and outbound messages coming from or going to the network 205. The CPU 420 may also be configured to control other components of the PDSN 225.

The CPU 420 may further be coupled to a memory 430 via the bus 417. The CPU 420 may read information from or write information to the memory 430. For example, the memory 430 may be configured to store inbound or outbound messages before, during, or after processing. The memory 430 may also comprise instructions or functions in the form of modules for execution on the CPU 420. For example, the memory 430 may comprise the DPI module 229 and the filter manager module 440. The operation of the CPU 420 executing each of the modules is described below.

The DPI module 229 may comprise instructions executable on the CPU 420. When executed by the CPU 420, the DPI module 229 may cause the CPU 420 to process incoming/outgoing data packets. As discussed above with respect to FIG. 2 the DPI module 229, for example, may be configured to inspect data packets received from the network 205 and direct them over the appropriate link to the AN 104a via the BSC 220 according to filters indicated in a filter record stored on the memory 430.

The filter manager module 440 may comprise instructions executable on the CPU 420. When executed, the filter manager module 440 may further cause the CPU 420 of the PDSN 225 to process one or more filter messages. For example, the PDSN 225 may receive a filter message at the transmit circuit 410. The filter message may be received from the AT 106a via the BSC 220 as discussed above with respect to FIG. 2. The filter message may comprise a command to install a new filter with a precedence index. If the filter manager module 440 determines that a filter with the precedence index does not exist, the filter manager module 440 causes the CPU 420 to enter an indication of the filter in the filter record stored on the memory 430. Further, the filter manager module 440 causes the CPU 420 to generate a response message (e.g., RESV response message) and send the message to the transmit circuit 410 via the bus 417. The transmit circuit 410 may then send the message to the AT 106a.

In one embodiment, if the filter manager module 440 determines that a filter with the precedence index does exist, the filter manager module 440 causes the CPU 420 to generate an error message (e.g., RESV error message) and send the message to the transmit circuit 410 via the bus 417. The transmit circuit 410 may then send the message to the AT 106a. In addition to the above, or in the alternative, the filter manager module 440 causes the CPU 420 to begin a resynchronization with the AT 106a (e.g., start a PPP resynchronization). For example, the CPU 420 may generate a PPP resynchronization command and send the command message to the transmit circuit 410 via the bus 417. The transmit circuit 410 may then send the command to the AT 106a. The PDSN 225 and the AT 106a may then perform a PPP resynchronization.

The transmit circuit 410 may comprise a modulator configured to modulate outbound messages going to the BSC 220 and/or the network 205. The receive circuit 415 may comprise a demodulator configured to demodulate inbound messages coming from the BSC 220 and/or the network 205.

The memory 430 may comprise processor cache, including a multi-level hierarchical cache in which different levels have different capacities and access speeds. The memory 430 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, Zip drives, etc.

Although described separately, it is to be appreciated that functional blocks described with respect to the PDSN 225 need not be separate structural elements. For example, the CPU 420 and the memory 430 may be embodied on a single chip. The CPU 420 may additionally, or in the alternative, contain memory, such as processor registers. Similarly, one or more of the functional blocks or portions of the functionality of various blocks may be embodies on a single chip. Alternatively, the functionality of a particular block may be implemented on two or more chips.

One or more of the functional blocks and/or one or more combinations of the functional blocks described with respect to the PDSN 225, such as the CPU 420, may be embodied as a general purpose processor, a digital signal processor (DSP), an application specific integrated device, discrete gate or transistor logic, discrete hardware components, circuitry or any suitable combination thereof designed to perform the functions described herein. Further, though described above as instructions stored in the memory 430 executable on the CPU 420, each of the DPI module 229 and the filter manager module 440 may alternatively be embodied as a general purpose processor, a digital signal processor (DSP), an application specific integrated device, discrete gate or transistor logic, discrete hardware components, circuitry or any suitable combination thereof designed to perform the functions described herein and further each may be controlled by the CPU 420. As noted above, it should be clear that the term "circuitry" is construed as a structural term and not as a functional term. For example, circuitry can be an aggregate of circuit components, such as a multiplicity of integrated circuit components, in the form of processing and/or memory cells, units, blocks, and the like, such as shown and described in FIG. 4. One or more of the functional blocks and/or one or more combinations of the functional blocks described with respect to the AT 106a may also be implemented as a combination of computing devices, e.g., a combination of a DSP and a microprocessor, a plurality of microprocessors, one or more microprocessor in conjunction with a DSP communication, or any other such configuration.

Figure 5:
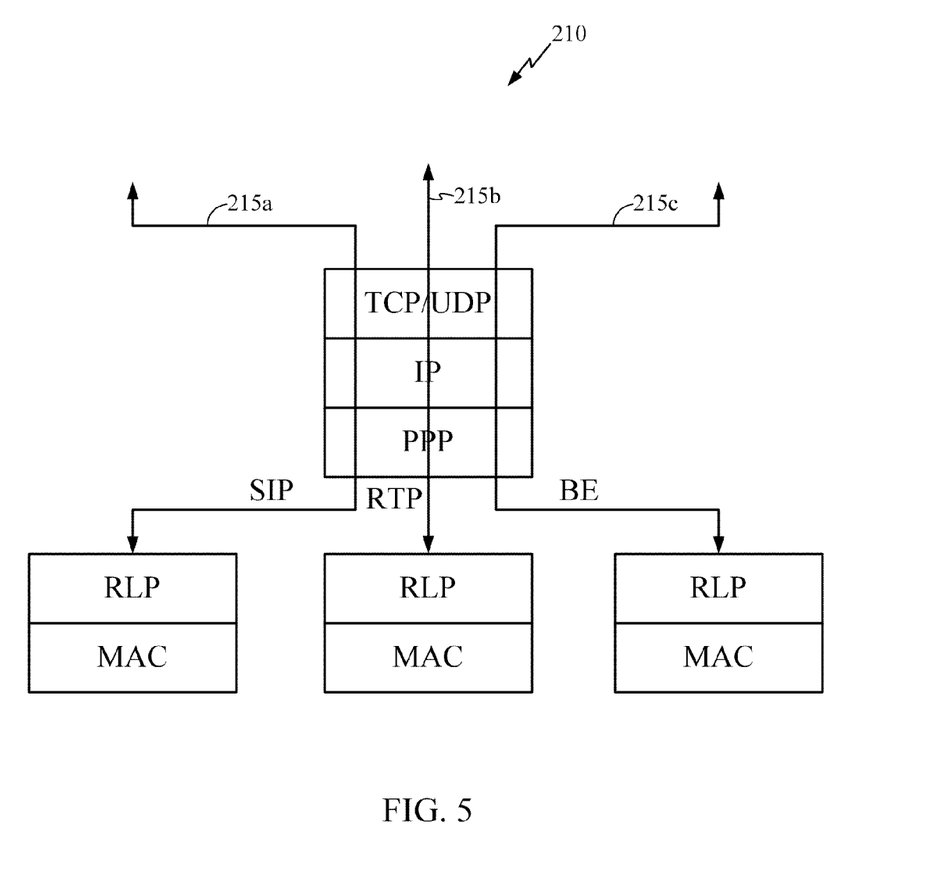
FIG. 5 illustrates exemplary logical data paths for the data pipes between an access terminal (AT) and an access node (AN) of FIG. 2.

FIG. 5 illustrates exemplary logical data paths for the data pipes 215a-215c between the AT 106a and the AN 104a of FIG. 2. As discussed above with respect to FIG. 2, the AT 106a may receive data from the data source 202 via the AN 104a. The AT 106a may form a communication link 210 with the AN 104a. Further, the communication link 210 may comprise one or more data pipes 215-215c, which, as discussed above with respect to FIG. 2, may each comprise an airlink.

FIG. 5 schematically shows the data pipes 215a-215c in relation to a layer stack for communicating data over the communication link 210.

The data pipes 215a-215c may comprise a transport layer (e.g., transmission control protocol (TCP) layer, user datagram protocol (UDP) layer, etc.), an IP layer, a Point to Point Protocol (PPP) layer, one or more Radio Link Protocol (RLP) layers, and one or more Medium Access Control (MAC) layers. The transport layer may comprise a group of methods and protocols responsible for encapsulating data packets into data units suitable for transfer. The IP layer may comprise a group of methods and protocols used to transport data packets to a destination specified by a network address (e.g., IP address). The PPP layer may comprise a group of methods and protocols for interconnecting devices (e.g., the AT 106a and the AN 104a). The RLP layer may comprise a group of methods and protocols for detecting loss of data packets between devices and performing retransmissions. The MAC layer may comprise a group of methods and protocols for devices to communicate within a multipoint network (e.g., a network connecting multiple devices together).

Each layer in the layer stack configures the data to be sent via the communication link 210. As shown, all of the data pipes 215a-215c share the same Point to Point Protocol (PPP) layer, IP layer, and transport layer (e.g., transmission control protocol (TCP) layer, user datagram protocol (UDP) layer, etc.). Below the PPP layer, the data path for each of the data pipes 215a-215c is differentiated at the Radio Link Protocol (RLP) and the Medium Access Control (MAC) layers.

Figure 6:
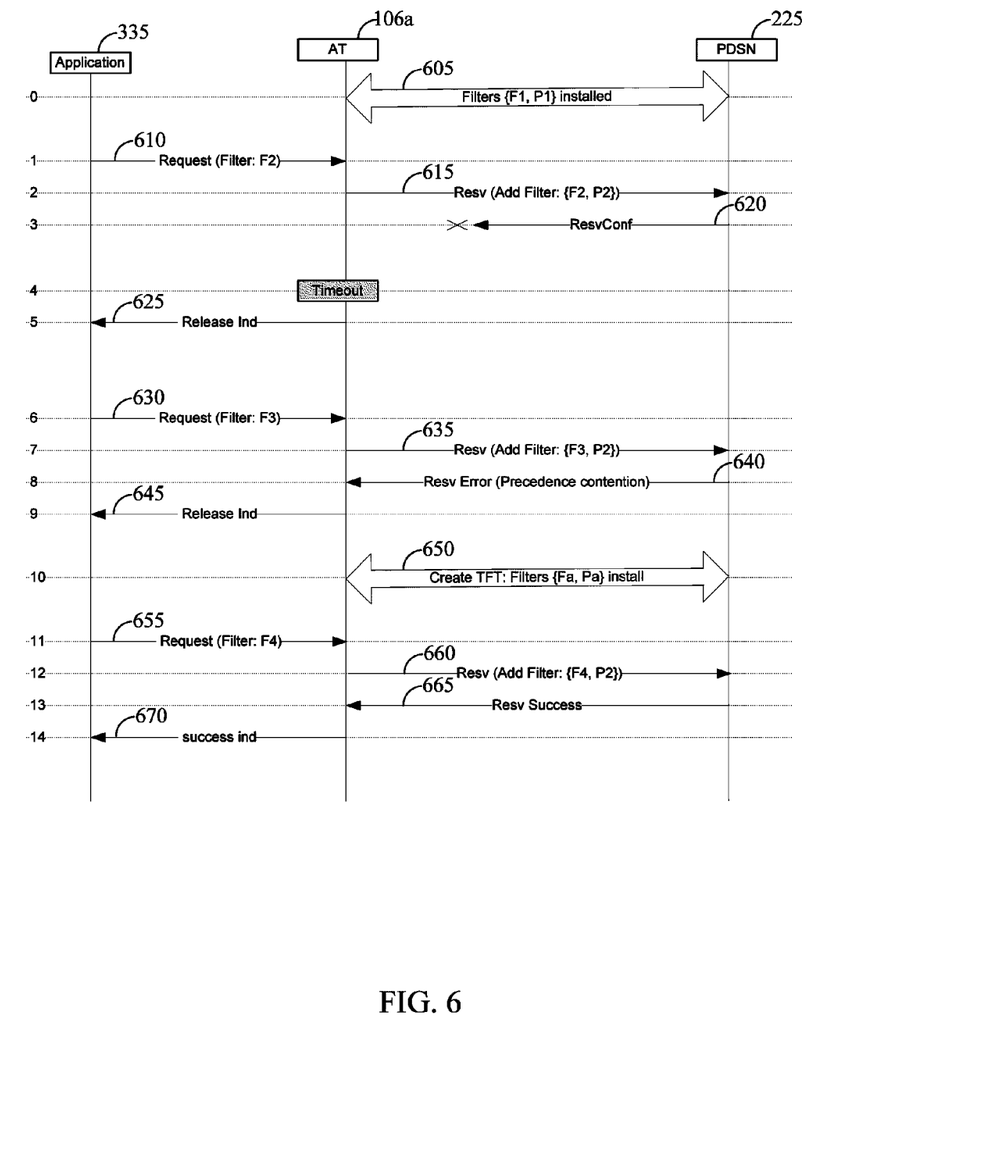
FIG. 6 is an exemplary signal flow diagram illustrating signal flow between an access terminal (AT), an access node (AN), and a packet data service node (PDSN) of FIG. 2.

FIG. 6 is an exemplary signal flow diagram illustrating signal flow between the application module 335 running on the AT 106a, the AT 106a, and the PDSN 225 of FIGS. 2-4. As described above with respect to FIG. 2, the signal flow may be used to synchronize filter records between the AT 106a and the PDSN 225. The application module 335 running on the AT 106a, the AT 106a, and the PDSN 225 are shown horizontally at the top of the figure. The flow of various signals or data packets communicated between apparatuses is shown with directional arrows. The sequence of flow of signals occurs as time progresses. The progression of time is shown along the vertical axis of FIG. 6, with time starting at the top of the page and progressing down the page.

At a first block 605, the AT 106a sends a filter message to install a filter F1 with a precedence P1 to the PDSN 225. The PDSN installs the filter F1 and sends a reservation confirmation (ResvConf) message (e.g., a RESV response message) to the AT 106a which receives the message. Continuing at a block 610, the application module 335 running on the AT 106a requests a filter F2 be installed at the PDSN 225. Further at a block 615, the AT 106a sends a filter message to install the filter F2 with a precedence P2 to the PDSN 225. At the block 620, the PDSN 225 then installs the filter and sends a ResvConf message to the AT 106a. The AT 106a does not receive the ResvConf message. This may be due to a bad forward link between the PDSN 225 and the AT 106a. In one embodiment, at a block 625, the AT 106a indicates to the application module 335 that the ResvConf message has not been received. In another embodiment, the application module 335 waits for a predetermined time period before determining that the PDSN 225 did not receive its request.

Continuing at a block 630, the application module 335 running on the AT 106a requests a filter F3 be installed at the PDSN 225. Further at a block 635, the AT 106a sends a filter message to install the filter F3 with a precedence P2 to the PDSN 225. It should be noted the AT 106a uses the precedence P2 for the filter F3 even though it is the same precedence value as used for the filter F2 in view of the fact that the AT 106a did not receive an indication the filter F2 is installed and therefore does not know the precedence P2 is in use. Next, at a block 640, the PDSN 225 determines it already has a filter installed with a precedence P2. Accordingly, the PDSN 225 sends an error message (e.g., a RESV error message) to the AT 106a. Further at a block 645, the AT 106a indicates the error to the application module 335.

Next, at the block 650, the AT 106a sends a Create TFT command to the PDSN 225, which removes all of the filters at the PDSN 225. The filter records of the AT 106a and the PDSN 225 accordingly comprise no filters. Further, at a block 655, the application module 335 running on the AT 106a requests a filter F4 to be installed at the PDSN 225. Continuing at a block 660, the AT 106a sends a filter message to install a filter F4 with a precedence P2 to the PDSN 225. Further at a block 665, the PDSN 225 installs the filter F4 and sends a reservation confirmation (ResvConf) message (e.g., a RESV response message) to the AT 106a which receives the message. Next, at the block 670, the AT 106a indicates to the application module 335 that the filter F4 was successfully installed.

One of ordinary skill in the art will recognize that one or more applications may be activated and deactivated at various times on the AT 106a and one or more filters may be installed, triggering similar events to the blocks described above with respect to FIG. 6.

Figure 7:
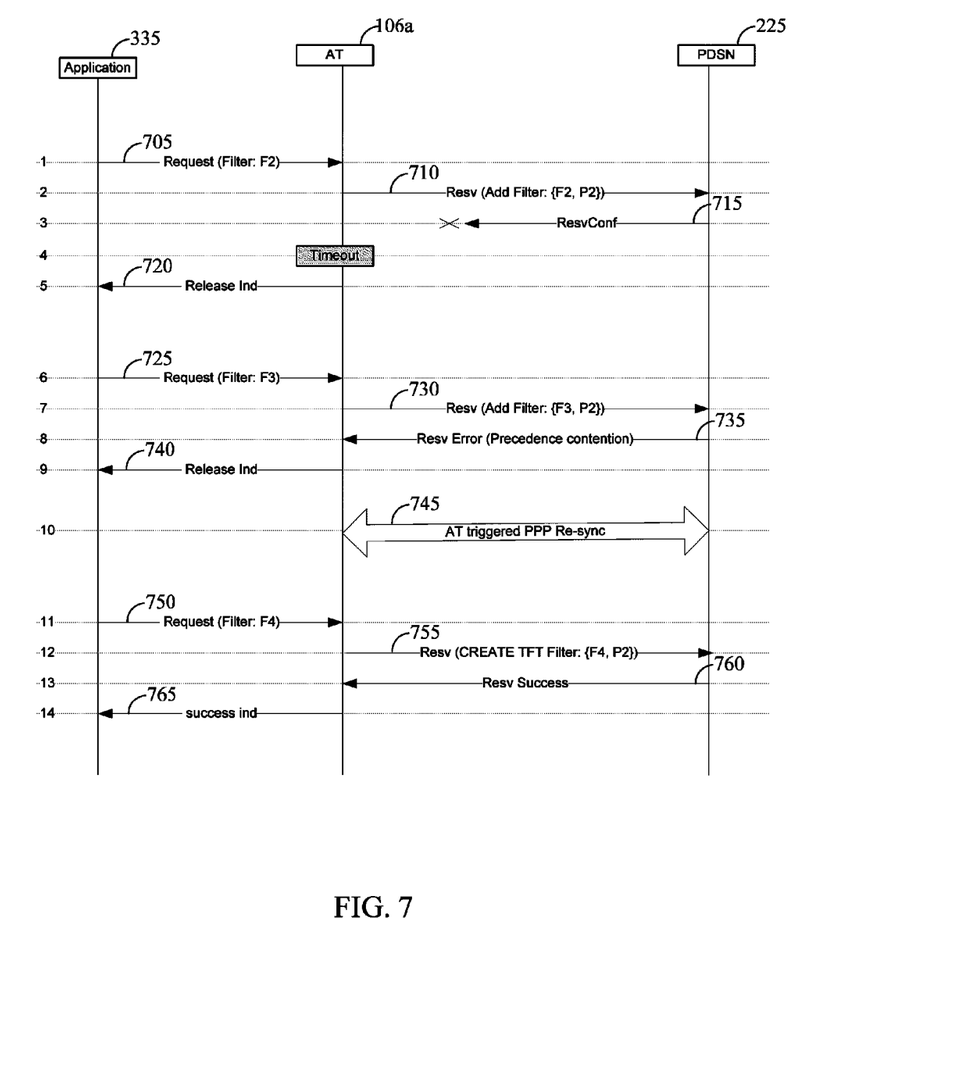
FIG. 7 is another exemplary signal flow diagram illustrating signal flow between an access terminal (AT), an access node (AN), and a packet data service node (PDSN) of FIG. 2.

FIG. 7 is an exemplary signal flow diagram illustrating signal flow between the application module 335 running on the AT 106a, the AT 106a, and the PDSN 225 of FIGS. 2-4. As described above with respect to FIG. 2, the signal flow may be used to synchronize filter records between the AT 106a and the PDSN 225. The application module 335 running on the AT 106a, the AT 106a, and the PDSN 225 are shown horizontally at the top of the figure. The flow of various signals or data packets communicated between apparatuses is shown with directional arrows. The sequence of flow of signals occurs as time progresses. The progression of time is shown along the vertical axis of FIG. 7, with time starting at the top of the page and progressing down the page.

At a first block 705, the application module 335 running on the AT 106a requests a filter F2 be installed at the PDSN 225. Further at a block 710, the AT 106a sends a filter message to install the filter F2 with a precedence P2 to the PDSN 225. At the block 715, the PDSN 225 then installs the filter and sends a ResvConf message to the AT 106a. The AT 106a does not receive the ResvConf message. This may be due to a bad forward link between the PDSN 225 and the AT 106a. In one embodiment, at a block 720, the AT 106a indicates to the application module 335 that the ResvConf message has not been received. In another embodiment, the application module 335 waits for a predetermined time period before determining that the PDSN 225 did not receive its request.

Continuing at a block 725, the application module 335 running on the AT 106a requests a filter F3 be installed at the PDSN 225. Further at a block 730, the AT 106a sends a filter message to install the filter F3 with a precedence P2 to the PDSN 225. It should be noted the AT 106a uses the precedence P2 for the filter F3 even though it is the same precedence value as used for the filter F2 in view of the fact that the AT 106a did not receive an indication the filter F2 is installed and therefore does not know the precedence P2 is in use. Next, at a block 735, the PDSN 225 determines it already has a filter installed with a precedence P2. Accordingly, the PDSN 225 sends an error message (e.g., a RESV error message) to the AT 106a. Further at a block 740, the AT 106a indicates the error to the application module 335.

Next, at the block 750, the AT 106a triggers a PPP resynchronization procedure with the PDSN 225. The filter records of the AT 106a and the PDSN 225 accordingly are deleted. Further, at a block 750, the application module 335 running on the AT 106a requests a filter F4 to be installed at the PDSN 225. Continuing at a block 755, the AT 106a sends a Create TFT command with an indication to install a filter F4 with a precedence P2 to the PDSN 225. Further at a block 760, the PDSN 225 creates a filter record and installs the filter F4 and sends a reservation confirmation (ResvConf) message (e.g., a RESV response message) to the AT 106a which receives the message. Next, at the block 765, the AT 106a indicates to the application module 335 that the filter F4 was successfully installed.

One of ordinary skill in the art will recognize that one or more applications may be activated and deactivated at various times on the AT 106a and one or more filters may be installed, triggering similar events related to the blocks described above with respect to FIG. 7.

Figure 8:
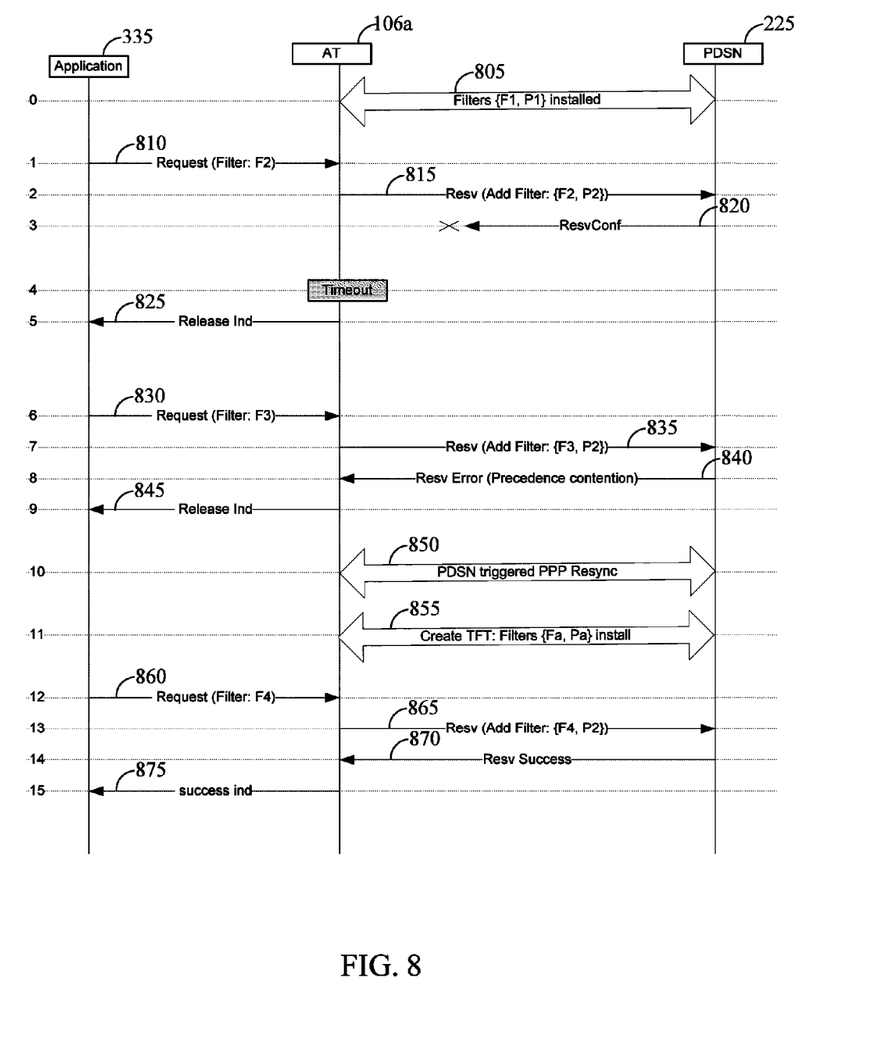
FIG. 8 is another exemplary signal flow diagram illustrating signal flow between an access terminal (AT), an access node (AN), and a packet data service node (PDSN) of FIG. 2.

FIG. 8 is an exemplary signal flow diagram illustrating signal flow between the application module 335 running on the AT 106a, the AT 106a, and the PDSN 225 of FIGS. 2-4. As described above with respect to FIG. 2, the signal flow may be used to synchronize filter records between the AT 106a and the PDSN 225. The application module 335 running on the AT 106a, the AT 106a, and the PDSN 225 are shown horizontally at the top of the figure. The flow of various signals or data packets communicated between apparatuses is shown with directional arrows. The sequence of flow of signals occurs as time progresses. The progression of time is shown along the vertical axis of FIG. 8, with time starting at the top of the page and progressing down the page.

At a first block 805, the AT 106a sends a filter message to install a filter F1 with a precedence P1 to the PDSN 225. The PDSN installs the filter F1 and sends a reservation confirmation (ResvConf) message (e.g., a RESV response message) to the AT 106a which receives the message. Continuing at a block 810, the application module 335 running on the AT 106a requests a filter F2 be installed at the PDSN 225. Further at a block 815, the AT 106a sends a filter message to install the filter F2 with a precedence P2 to the PDSN 225. At the block 820, the PDSN 225 then installs the filter and sends a ResvConf message to the AT 106a. The AT 106a does not receive the ResvConf message. This may be due to a bad forward link between the PDSN 225 and the AT 106a. In one embodiment, at a block 825, the AT 106a indicates to the application module 335 that the ResvConf message has not been received. In another embodiment, the application module 335 waits for a predetermined time period before determining that the PDSN 225 did not receive its request.

Continuing at a block 830, the application module 335 running on the AT 106a requests a filter F3 be installed at the PDSN 225. Further at a block 835, the AT 106a sends a filter message to install the filter F3 with a precedence P2 to the PDSN 225. It should be noted the AT 106a uses the precedence P2 for the filter F3 even though it is the same precedence value as used for the filter F2 in view of the fact that the AT 106a did not receive an indication the filter F2 is installed and therefore does not know the precedence P2 is in use. Next, at a block 840, the PDSN 225 determines it already has a filter installed with a precedence P2. Accordingly, the PDSN 225 sends an error message (e.g., a RESV error message) to the AT 106a. Further at a block 845, the AT 106a indicates the error to the application module 335.

Next, at the block 850, the PDSN 225 triggers a PPP resynchronization procedure with the AT 106a. The filter records of the AT 106a and the PDSN 225 accordingly are deleted. Continuing, at the block 855, the AT 106a sends a Create TFT command to the PDSN 225, which creates an empty filter record. The filter records of the AT 106a and the PDSN 225 accordingly comprise no filters. Further, at a block 860, the application module 335 running on the AT 106a requests a filter F4 to be installed at the PDSN 225. Continuing at a block 865, the AT 106a sends a filter message to install a filter F4 with a precedence P2 to the PDSN 225. Further at a block 870, the PDSN 225 installs the filter F4 and sends a reservation confirmation (ResvConf) message (e.g., a RESV response message) to the AT 106a which receives the message. Next, at the block 875, the AT 106a indicates to the application module 335 that the filter F4 was successfully installed.

One of ordinary skill in the art will recognize that one or more applications may be activated and deactivated at various times on the AT 106a and one or more filters may be installed, triggering similar events related to the blocks described above with respect to FIG. 8.

Figure 9:
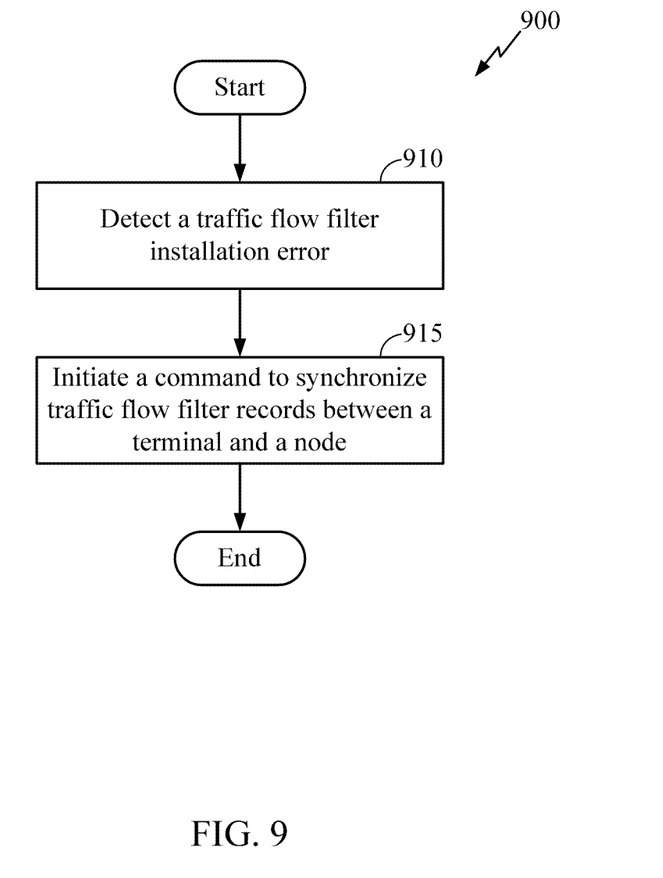
FIG. 9 is a flowchart of an exemplary process for synchronizing filter records between an access terminal (AT) and an access node (AN) of FIG. 2.

FIG. 9 a flowchart of an exemplary process for synchronizing filter records between the AT 106a and the PDSN 225 of FIG. 2. At step 910, either the AT 106a or the PDSN 225 detects a traffic flow filter installation error. The AT 106a or the PDSN 225 may detect a traffic flow filter installation error as described above. Continuing at a step 915, the AT 106a or the PDSN 225 initiates a command to synchronize traffic flow filter records between the AT 106a and the PDSN 225. The AT 106a or the PDSN 225 may synchronize traffic flow filter records as described above One of ordinary skill in the art should recognize that for process 900, various steps may be added or omitted without departing from the spirit or scope of the invention.

Figure 10:
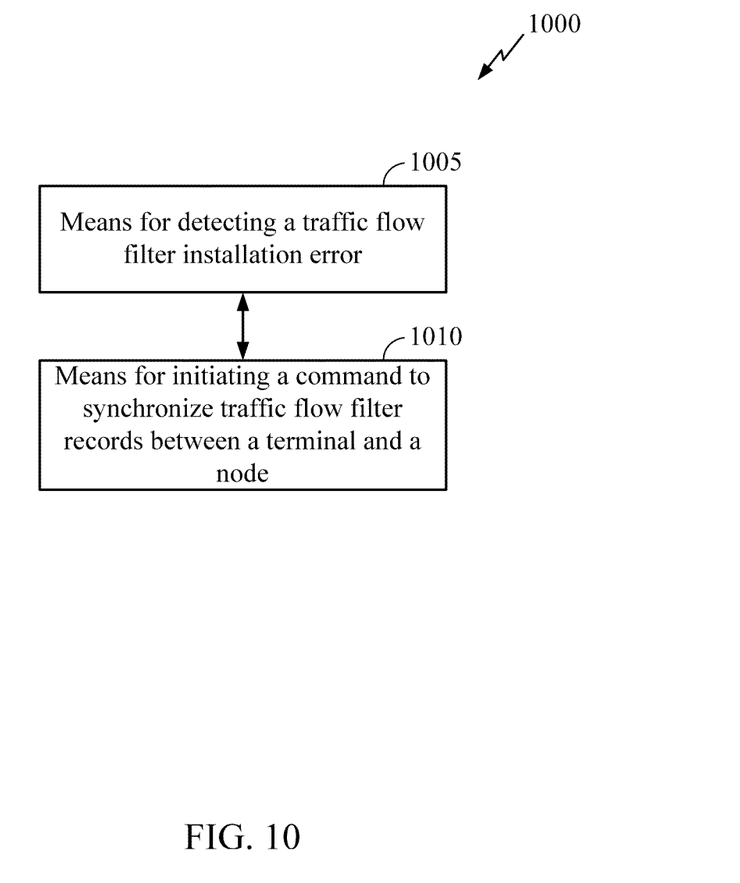
FIG. 10 illustrates a functional block diagram of another exemplary device shown in FIG. 1.

FIG. 10 illustrates a functional block diagram of another exemplary device shown in FIG. 1. Device 1000 comprises means 1005 and 1010 for performing the various actions discussed with respect to the AT 106a and/or the PDSN 225 herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

The invention claimed is:

1. A method for synchronizing traffic flow filter records between a terminal and a node, the method comprising:
   transmitting, from the terminal to the node, a traffic flow filter installation request;
   monitoring a communication link for receipt of a confirmation message from the node;
   detecting a traffic flow filter installation error based on a non-receipt of the confirmation message from the node through the communication link; and
   initiating a command to synchronize traffic flow filter records between the terminal and the node based at least in part on the detected traffic flow filter installation error;
   wherein initiating the command to synchronize the traffic flow filter records comprises the terminal deleting a first traffic flow filter record at the node and reinstalling a second traffic flow filter record at the node.

2. The method of claim 1, wherein detecting a traffic flow filter installation error comprises detecting at the node a precedence contention for traffic flow filter installation at an index, and further comprising:
   installing a traffic flow filter in the node in response to the traffic flow filter installation request;
   transmitting the confirmation message by the node into the communication link.

3. The method of claim 1, wherein initiating a command to synchronize the traffic flow filter records comprises creating a traffic flow template.

4. The method of claim 1, wherein initiating a command to synchronize the traffic flow filter records further comprises the node initiating a resynchronization procedure.

5. The method of claim 4, wherein the resynchronization procedure comprises a point-to-point protocol (PPP) re-sync command.

6. The method of claim 1, wherein initiating a command to synchronize the traffic flow filter records comprises the terminal initiating a resynchronization procedure.

7. The method of claim 6, wherein the resynchronization procedure comprises a point-to-point protocol (PPP) re-sync.

8. A device operative in a communication network, the device comprising:
   a processor; and
   circuitry coupled to the processor, the circuitry and the processor being cooperatively configured to:

transmit a traffic flow filter installation request to another device;

monitor a communication link for receipt of a confirmation message from the another device;

detect a traffic flow filter installation error based on a non-receipt of the confirmation message through the communication link; and initiate a command to synchronize traffic flow filter records with the another device based at least in part on the detected traffic flow filter installation error;

wherein the circuitry and the processor are further cooperatively configured to delete a first traffic flow filter record and reinstall a second traffic flow filter record.

9. The device of claim 8, wherein the circuitry and the processor are further cooperatively configured to detect a precedence contention for traffic flow filter installation at an index.

10. The device of claim 8, wherein the circuitry and the processor are further cooperatively configured to initiate a create traffic flow template command.

11. The device of claim 8, wherein the circuitry and the processor are further cooperatively configured to initiate a resynchronization procedure.

12. The device of claim 11, wherein the resynchronization procedure comprises a point-to-point protocol (PPP) re-sync.

13. A:

non-transitory computer-readable medium comprising:

code for causing a computer to transmit a traffic flow filter installation request to a node;

code for monitoring a communication link for receipt of a confirmation message from the node;

code for causing a computer to detect a traffic flow filter installation error based on a non-receipt of the confirmation message through the communication link; and code for causing a computer to initiate a command to synchronize traffic flow filter records between a terminal and the node based at least in part on the detected traffic flow filter installation error;

wherein code for causing a computer to initiate the command to synchronize the traffic flow filter records comprises code for causing the terminal to delete a first traffic flow filter record at the node and reinstalling a second traffic flow filter record at the node.

14. The computer program product of claim 13, wherein code for causing a computer to detect a traffic flow filter installation error comprises code for causing the node to detect a precedence contention for traffic flow filter installation at an index.

15. The computer program product of claim 13, wherein code for causing a computer to initiate a command to synchronize the traffic flow filter records comprises code for causing a computer to create a traffic flow template.

16. The computer program product of claim 15, wherein code for causing a computer to initiate a command to synchronize the traffic flow filter records further comprises code for causing the node to initiate a resynchronization procedure.

17. The computer program product of claim 16, wherein the resynchronization procedure comprises a point-to-point protocol (PPP) re-sync command.

18. The computer program product of claim 13, wherein code for causing a computer to initiate a command to synchronize the traffic flow filter records comprises code for causing the terminal to initiate a resynchronization procedure.

19. The computer program product of claim 18, wherein the resynchronization procedure comprises a point-to-point protocol (PPP) re-sync.

20. A device operative in a communication network, the device comprising:

means for transmitting a traffic flow filter installation request from the device to a node;

means for monitoring a communication link for receipt of a confirmation message from the node;

means for detecting a traffic flow filter installation error based on a non-receipt of the confirmation message through the communication link;

means for initiating a command to synchronize traffic flow filter records with the node based at least in part on the detected traffic flow filter installation error; and means for deleting a first traffic flow filter record and reinstalling a second traffic flow filter record.

21. The device of claim 20, further comprising means for detecting a precedence contention for traffic flow filter installation at an index.

22. The device of claim 20, further comprising means for initiating a create traffic flow template command.

23. The device of claim 20, further comprising means for initiating a resynchronization procedure.

24. The device of claim 23, wherein the resynchronization procedure comprises a point-to-point protocol (PPP) re-sync.

* * * * *